Nov. 17, 1925.  B. S. ROGERS  1,562,057
CLUTCH PEDAL LOCK
Filed March 30, 1925
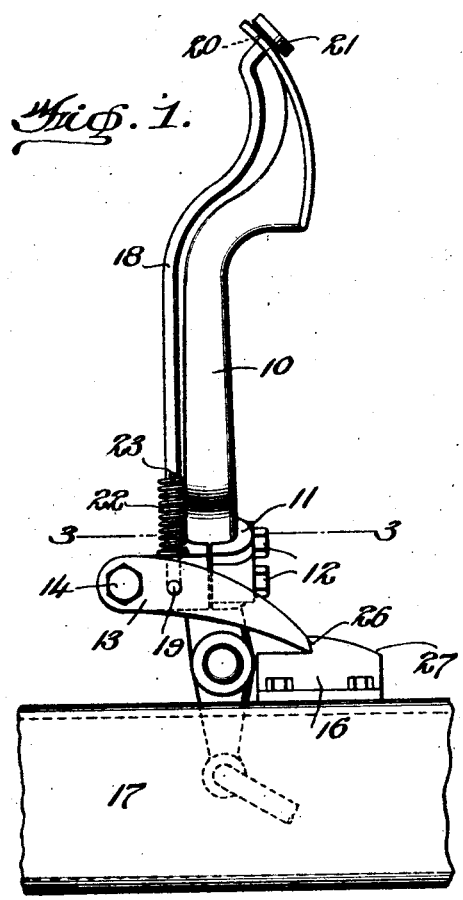
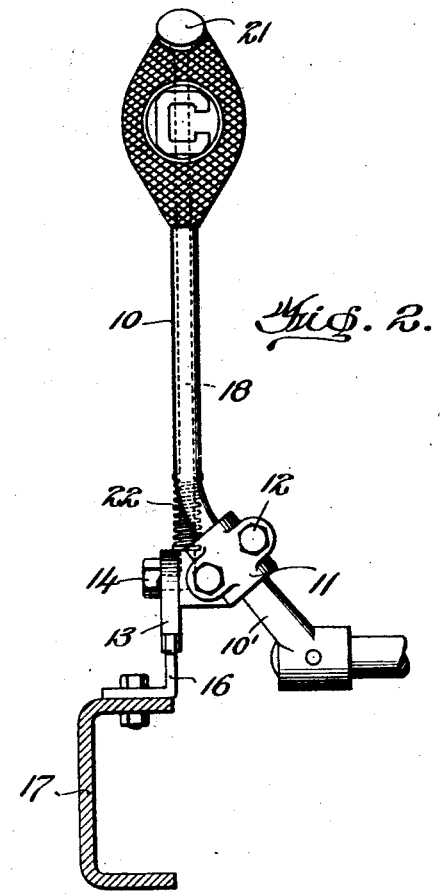
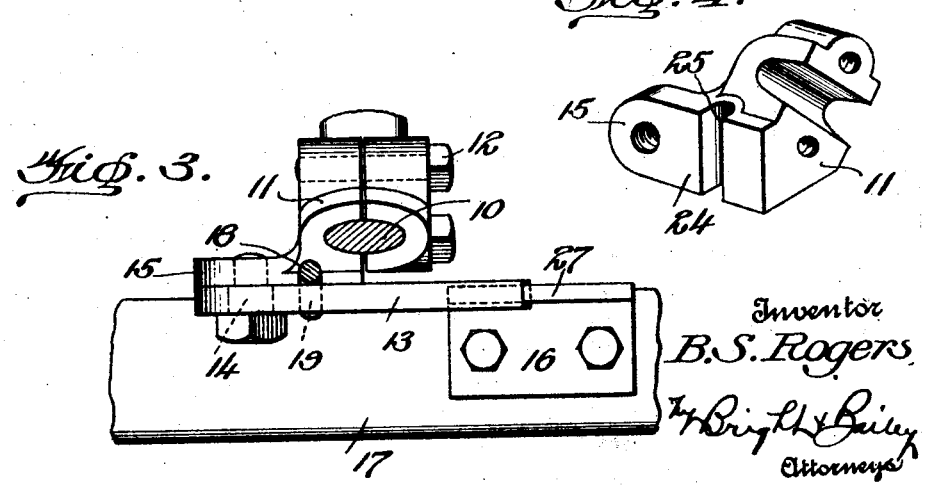
Inventor
B. S. Rogers Patented Nov. 17, 1925.

1,562,057

UNITED STATES PATENT OFFICE.

BURR S. ROGERS, OF LINDSEY, OHIO, ASSIGNOR OF ONE-SIXTH TO EDGAR ROGERS, ONE-SIXTH TO FLOYD ROGERS, ONE-EIGHTH TO C. L. BLOKER, ONE-EIGHTH TO R. E. BLOKER, ONE-EIGHTH TO D. H. OVERMYER, AND ONE-EIGHTH TO FRED C. MAGSIG, ALL OF LINDSEY, OHIO.

CLUTCH-PEDAL LOCK.

Application filed March 30, 1925. Serial No. 19,506.

*To all whom it may concern:*

Be it known that I, BURR S. ROGERS, a citizen of the United States, and resident of Lindsey, in the county of Sandusky and State of Ohio, have invented certain new and useful Improvements in Clutch-Pedal Locks, of which the following is a specification.

My invention relates to a clutch pedal lock, particularly intended although not limited to use on Ford automobiles, and my purpose, generally speaking, is to provide a simple, inexpensive, easily applied and efficient device for locking a clutch pedal in neutral position, whereby the necessity of manually holding the same in neutral position when the automobile is coasting for example, or setting of an emergency brake, as in a Ford type of automobile to maintain the clutch pedal in a neutral position when the automobile is at rest, and with the engine running, or of releasing a gear shift lever before releasing the clutch pedal as in other types of automobiles, when bringing the automobile to a halt, with the engine running, is eliminated.

With the foregoing general purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a side elevation of an automobile clutch pedal and a portion of the automobile frame, showing my improved locking means operatively associated therewith;

Figure 2, a rear elevation partly in section of the parts shown in Figure 1;

Figure 3, a horizontal section on the line 3—3 of Figure 1; and

Figure 4, a detail perspective of the locking pawl supporting bracket member.

In the present instance I have shown my device associated with the clutch pedal 10 of a planetary type of transmission mechanism, such as is used, for example, in Ford automobiles, but as will hereinafter become more fully apparent, it may be associated with the clutch pedal of any other type of automobile to lock the clutch pedal in neutral position for any of the purposes previously enumerated.

When in a neutral position, clutch pedal 10 is disposed substantially vertical as shown in Figure 1 of the drawings, from which position it is movable forward or to the left as shown in said figure to establish a low gear ratio between the engine of the automobile and the drive wheels of the latter, and rearward or to the right to establish a high gear ratio between the engine and drive wheels. As is understood, a spring (not shown) normally urges the clutch pedal to the rear so that under ordinary circumstances it is necessary to maintain pressure on the clutch pedal to hold it either in neutral or in low speed establishing position.

My device is composed of a minimum number of parts and consists essentially of a two part bracket 11 adapted to be clamped by bolts 12 to the arm of the clutch pedal near the pivot of the latter; a pawl 13 pivoted at one end, as at 14, to an extension 15 of one of the sections of said bracket and adapted for cooperation at its other end with a fixed stop member 16 secured, for example, to the frame 17 of the automobile; an operating rod 18 pivoted at one end as at 19 to an intermediate portion of pawl 13 and at its other end engaged through an opening 20 in the foot engaging portion of the pedal 10 and equipped with a detachable button 21 upon which foot pressure may be exerted to force the free end of the pawl downward; and a spring 22 between bracket 11 and a stop 23 on the rod 18 operating on said rod to normally urge the free end of the pawl upward.

The extension 15 of the section of bracket 11 to which pawl 13 is pivoted is provided with a flat face 24 against, or close to which, one side of said pawl is disposed, and formed in said bracket section and opening through said flat face is a recess 25 through which the rod 18 passes whereby it is guided in its movements to operate the pawl and whereby the pawl itself serves to hold it within said recess, as shown in Figure 3, so that whenever for any reason it may be desired to remove the device from the clutch pedal, such removal may be effected merely by disconnecting the pawl from the bracket 11 and moving the rod out of the recess 25, without disconnecting the bracket from the pedal.

Clutch pedal 10, being of standard construction, is straight and vertically disposed throughout substantially its full length, but is inclined to the vertical throughout a minor portion of its length near its lower end as indicated at 10'. One of my purposes is to so construct and arrange the parts of my device that when said parts are operatively associated with the clutch pedal they will be disposed to the rear of and thereby be protected by the clutch pedal, and to this end I form the pawl supporting bracket section 11 so that the part thereof which engages the inclined portion 10' of the pedal is inclined to the part thereof to which the pawl is pivoted, whereby the pawl will be so disposed that its operating rod 18 will lie directly behind the pedal.

The free end of pawl 13 is inclined forwardly and the stop member 16 is provided with a notch having a similarly inclined face 26 against which the inclined free end of the pawl is adapted to abut so that when the clutch pedal is in neutral position, and despite the tendency of spring 22 to lift the free end of the pawl out of said notch, the clutch pedal will be held in a neutral position by said pawl because of the force constantly tending to swing the clutch pedal to the rear as aforementioned, which force maintains the inclined free end of the pawl in engagement with the inclined face 26 of the stop member and thus prevents spring 22 from lifting the pawl. Merely by pressing the clutch pedal forward a slight distance, however, without applying pressure upon the upper end of rod 18, the inclined free end of the pawl is moved away from the inclined face 26 of the stop member and the spring 22 then is free to act to raise the free end to the pawl to a position where it will not contact with the stop member, whereupon the clutch pedal may be operated in the ordinary manner without hindrance by my device. With the clutch pedal disposed to the rear or in high speed position it may be pushed forward to and locked in neutral position as aforesaid by applying pressure both to the pedal and to the upper end of the rod 18, the stop member 16 having a cam face 27 over which the free end of the pawl will ride until it reaches a position where it will drop into the notch in said stop member.

Thus it will be observed that to apply my device to a clutch pedal it is only necessary to bolt one clamp to the latter, to provide a small guide opening in the foot engaging portion of the pedal for the pawl operating rod and to bolt or clamp a stop member to the frame. The button 21, being detachable, and because of the arrangement whereby the pawl maintains the operating rod in its guide opening or recess in the pawl supporting bracket, it is apparent that all of the parts may readily be removed without disturbing the pawl supporting bracket, which is of importance inasmuch as the original relation will be restored when the removed parts again are applied and the necessity of making new adjustments therefore is eliminated. Moreover, my locking device as is apparent is composed of a minimum number of parts, and is positive in operation, and therefore is not liable to become jarred loose.

I claim:

1. In combination with a clutch pedal of an automobile, a bracket secured to said pedal, a pawl pivoted to said bracket, a stop member with which said pawl is adapted for engagement to prevent swinging movement of the clutch pedal in one direction, and a rod for operating said pawl into and out of engagement with said stop member, said rod being slidable within a recess in said bracket and being retained within said recess by said pawl.

2. In combination with a clutch pedal of an automobile, means to lock said pedal in a predetermined position including a pawl, a fixed stop member having a notch adapted to be engaged by said pawl, a rod for operating said pawl, and a single bracket secured to the clutch pedal pivotally supporting said pawl and slidably supporting and guiding said rod.

3. In combination with a clutch pedal of an automobile which is straight and vertically disposed throughout a major portion of its length and which includes a minor portion inclined to the vertical near its lower end, a bracket secured to the inclined portion of said clutch pedal and including an extension disposed in fore and aft alinement with the first mentioned portion of said clutch pedal, a pawl pivoted to said extension, a rod disposed in fore and aft alinement with the first mentioned portion of said clutch pedal and connected to said pawl for operating same, and a fixed stop member having a notch with which said pawl is adapted for cooperation.

In testimony whereof I hereunto affix my signature.

BURR S. ROGERS